July 18, 1933. J. C. WELLS 1,918,999
OPHTHALMIC LENS
Filed Sept. 16, 1929
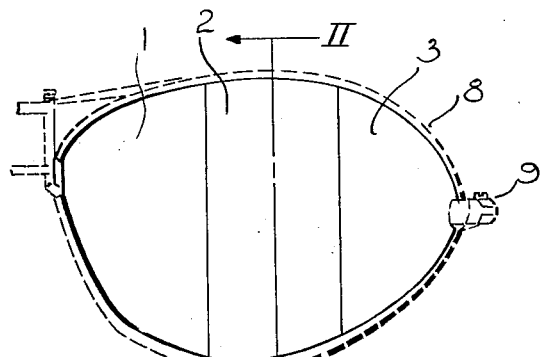
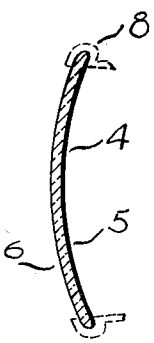
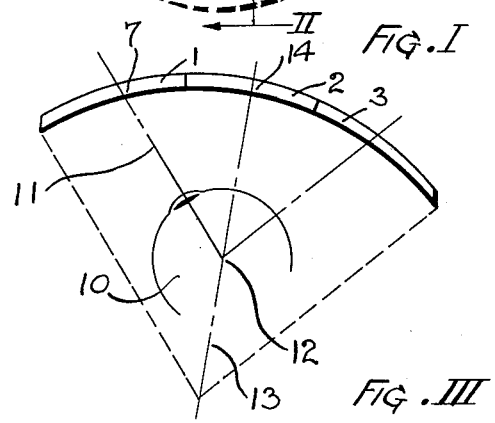
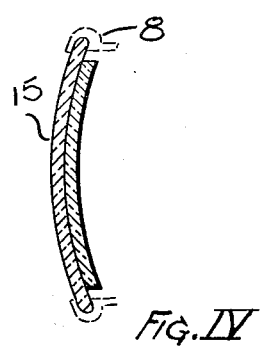
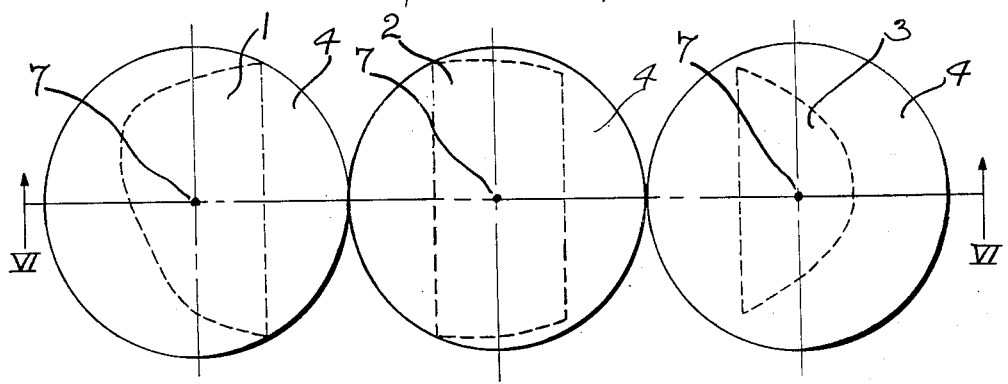
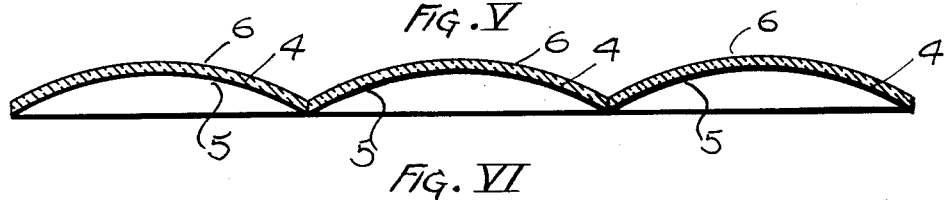
JOEL C. WELLS
INVENTOR
BY Harry H. Styll
ATTORNEY Patented July 18, 1933

1,918,999

UNITED STATES PATENT OFFICE

JOEL C. WELLS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC LENS

Application filed September 16, 1929. Serial No. 393,036.

This invention relates to ophthalmic lenses and has particular reference to an improved type of lens for use where both eye protection and eye-correction are required and the process of forming the same.

A principal object of this invention is to provide aviators, automobilists and others requiring large size protection lenses with their prescriptive power correction economically incorporated throughout the entire area of the lens.

Another object of this invention is to provide a combined protection and prescription lens of such construction as will eliminate almost entirely the dangerous and uncomfortable prismatic displacement usually found in such lenses.

Another object of this invention is to make possible the forming of any prescriptive power correction in a large size protection lens without limitation as to the degree of curvature that can be placed thereon.

Another object of this invention is to provide means of securely supporting and protecting the prescription element in such a lens.

Another object of this invention is to allow any degree of variation in power from one side of the lens to the other.

Another object of the invention is to make possible the utilizing of ordinary lens blanks by the prescription dealer to form the improved type of eye-protector embodying any desired prescriptive power correction, thus making the dispensing of these improved lenses as facile as that for ordinary lenses, inasmuch as these blanks are now made in huge quantities by the large manufacturers and shipped to the numerous small prescription shops for the various prescriptions to be placed thereon, this procedure lowering the cost of the finished lenses a great deal.

Other objects and advantages will become apparent from the following description taken in connection with the accompanying drawing and it will be apparent that many changes may be made in the details of construction, arrangement of parts and steps in the process without departing from the spirit of the invention as expressed in the accompanying claims. I, therefore, do not wish to be limited to the exact details shown and described as the preferred forms only have been shown by way of illustration.

Referring to the drawing:

Fig. I is a front view of an ophthalmic lens embodying the invention and showing the supporting frame in dotted lines.

Fig. II is a section taken on line II—II of Fig. I.

Fig. III is a diagrammatic top or plan view of Fig. I showing the features of the invention.

Fig. IV is a sectional view similar to Fig. II showing a modification.

Fig. V is a diagrammatic view showing a step in the construction.

Fig. VI is a section taken on line VI—VI of Fig. V.

Since the introduction of the large size protection mountings which conform closely to the contour of the wearer's face and support the protection lens in position before the eye, it has been found necessary to incorporate the wearer's prescriptive power correction in some manner. Various means have been tried to accomplish this desirable result, the obvious one being to so form the protection lens itself that the desired power would be given. This method is, however, mostly impossible as the curves required on the two surfaces often intersect before the required length of lens has been obtained. Other drawbacks are the excessive thickness required at one end preventing the lens from being fitted in a standard frame and the fact that no protection is given to the expensive kind of lens which this type usually proves to be.

It is the prime object of my invention, therefore, to provide means for the incorporation of the wearer's prescriptive power correction in a large size protection mounting without any of the disadvantages heretofore associated with this combination and at the same time to provide a lens having advantages of its own quite dissociated from those of previous lenses as will hereinafter be quite apparent.

Referring to the drawing wherein similar reference numerals denote corresponding parts throughout the several views, I first form a series of edging templates of the usual prior art kind which when placed in position edge to edge form the outline shape of a common form of protection lens. I have designated these shapes 1, 2 and 3 as shown in Fig. I and for the purposes of this description I am confining the series to this number, although it is clear that any number could be used with equal facility.

Having formed the templates, I next form by molding or other suitable method a series of spherical lens blanks 4 of the same size and all large enough to cover each size of template as shown in Fig. V. I next surface the lens blanks 4 on the concave side 5 to any convenient base curve and finish the convex side 6 by surfacing and polishing to a desired prescriptive power. The lenses 4 may be all of one prescriptive power or all of a different prescriptive power, as will hereinafter be apparent, but for this description they may be all of similar power.

By the usual prior art methods I next place the templates 1, 2 and 3 on separate blanks 4 and edge the blanks to the contour desired. As shown in Fig. V, I preferably leave the optical center 7 of the blanks 4 in the geometrical center of the segmental shapes formed by the edging process. It will be clear that I can now place the lens shapes so formed together edge to edge and insert them into a protection frame 8 and clamp said frame 8 onto the lenses by means of the usual endpiece 9.

I now have a large size protective field embodying any desired prescriptive power or powers. The nasal side 1 may be of similar power as the other sides 2 and 3, or the lenses may be graduated from strong to weak as may seem desirable. Any form of prescriptive power correction may be incorporated, such as spherical, cylinder, toric or combinations of the same.

Another improved feature of this invention is the elimination of the prismatic displacement formerly unavoidable in these large size protective mountings, and in Fig. III I have illustrated this feature. Referring particularly to Fig. III, a typical aviation goggle is 78 millimeters in length and is placed before the wearer's eye 10 so that the line of straight ahead vision 11 passes through the optical center 7 of the lens 1 at the nasal end.

The center of rotation 12 of the eye 10 is usually 32 millimeters from the posterior surface measured along line 13 passing through the geometrical center 14 and the center of rotation 12. It will be apparent, therefore, that the optical centers 7 of the three prescription fields will each in turn be traversed by the eye 10 in its rotation in its orbit and the prismatic displacement greatly lessened due to the fact that even at the distant temporal end an optical center is present.

It has been observed that in lenses not having an optical center at the temporal end great prismatic displacement takes place and that objects behind the wearer seen by slightly turning the head and looking through the temporal end of the lens are not where they appear to be due to this displacement. In my invention it will be obvious that the optical centers of the fields are all on the same horizontal meridian and at the most useful positions, thus eliminating the prismatic displacement formerly unavoidable.

In Fig. IV, I have shown a modified form wherein the prescription lenses are secured by cement or other means to a supporting lens 15 which may be a single piece of lens media of zero power shaped to a curvature corresponding to the collective curvature of the prescriptive lenses. A great amount of protection will thus be given the prescription lenses and avoidance of chipping or breakage rendered by the supporting lens 15.

The supporting lens 15 if used may be of colored glass to cut down the light rays, such as are encountered on bright days, or the prescription lenses themselves may be formed of this material. The economy of manufacture of the improved lens is one of the chief features, as will readily be apparent from the foregoing description. The small prescription dealer may carry the ordinary meniscus lens blanks having the base curve thereon as are now supplied in quantity by the manufacturer. The prescription dealer may place the wearer's prescriptive power correction on the unfinished side and edge the blanks to the outline shape required with a minimum of outlay for the templates, thus making the cost to the wearer extremely low.

From the foregoing it will be apparent that I have provided a protective lens design which incorporates the wearer's prescriptive power correction in any degree of power and at the same time provided simple means of eliminating the prismatic displacement which caused annoyance and trouble heretofore, together with economical and simple means of extending the prescriptive curvature throughout the entire area of the lens.

Having described my invention, I claim:—

1. An ophthalmic lens having a length extending from the nasal canthus beyond the temporal canthus of the eye when in place before the eye, comprising a plurality of lens sections having lens power surfaces and having substantially vertical abutting edges and each section an optical center, one of said optical centers lying between the geometrical center of the lens and the nasal edge thereof, another adjacent the temporal edge and another between the other two and means for holding said lens sections in said alignment.

2. An ophthalmic lens having a length extending from the nasal canthus beyond the temporal canthus of the eye when in place before the eye, comprising a plurality of lens sections having lens power surfaces and having substantially vertical abutting edges and each section an optical center, one of said optical centers lying between the geometrical center of the lens and the nasal edge thereof, another adjacent the temporal edge and another between the other two, and a transparent lens supporting member having optical surfaces and of the size and contour of the assembled lens sections and supporting said sections in said alignment.

3. An ophthalmic lens having a length extending from the nasal canthus beyond the temporal canthus of the eye when in place before the eye, comprising a plurality of lens sections having lens power surfaces and having substantially vertical abutting edges and each section an optical center, one of said optical centers lying between the geometrical center of the lens and the nasal edge thereof, another adjacent the temporal edge and another between the other two, and a colored transparent lens supporting member having optical surfaces and of the size and contour of the assembled lens sections and supporting said sections in said alignment.

4. An ophthalmic lens having a length extending from the nasal canthus beyond the temporal canthus of the eye when in place before the eye, comprising a plurality of lens sections having lens power surfaces and having substantially vertical abutting edges and each section an optical center, one of said optical centers lying between the geometrical center of the lens and the nasal edge thereof, and another optical center adjacent the temporal edge, and a transparent lens supporting member having optical surfaces and of the size and contour of the assembled lens sections and supporting said sections in said alignment.

5. An ophthalmic lens having a length extending from the nasal canthus beyond the temporal canthus of the eye when in place before the eye, comprising a plurality of lens sections having lens power surfaces and having substantially vertical abutting edges and each section an optical center, one of said optical centers lying between the geometrical center of the lens and the nasal edge thereof, and another optical center adjacent the temporal edge, and a colored transparent lens supporting member having optical surfaces and of the size and contour of the assembled lens sections and supporting said sections in said alignment.

6. An ophthalmic lens relatively long in width and relatively narrow in height comprising a plurality of lens sections having lens power surfaces and having substantially vertical abutting edges and each section an optical center, one of said optical centers lying between the geometrical center of the lens and the nasal edge thereof, another adjacent the temporal edge and another between the other two and means for holding the lens sections in said alignment.

JOEL C. WELLS.